United States Patent Office 3,159,667
Patented Dec. 1, 1964

3,159,667
SECONDARY ORGANOPHOSPHINE SULFIDES
AND THE PREPARATION THEREOF
Grace A. Peters, Stamford, Conn., assignor to American Cyanamid Company, New York, N.Y., a corporation of Maine
No Drawing. Filed Dec. 2, 1959, Ser. No. 856,665
7 Claims. (Cl. 260—481)

The present invention relates to new and useful organophosphorus compounds and to the preparation thereof. More particularly, the instant discovery concerns secondary phosphine sulfides.

The secondary phosphine sulfides herein contemplated correspond to the general formula

wherein X is a member selected from the group consisting of

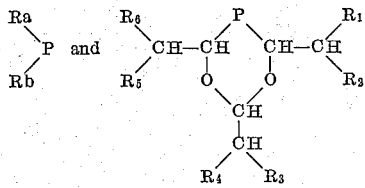

where Ra and Rb, respectively, represent substituted and unsubstituted, branched and straight chain saturated alkyl radicals, in which any given linear carbon chain of said radicals contains from 1 to 18 carbon atoms; substituted and unsubstituted aryl radicals; substituted and unsubstituted saturated alicyclic radicals; and Ra and Rb, respectively, are attached directly to the phosphorus atom through a carbon atom. Ra and Rb may be the same or different radicals.

$R_1$ to $R_6$ in the above formula represent alkyl chains of 1 to 10 carbon atoms and, as will be seen hereinafter, $R_1$, $R_2$, $R_3$, $R_4$, $R_5$ and $R_6$ may be the same or different radicals.

According to the present invention secondary phosphines corresponding to the groups just defined are reacted with one molar equivalent of sulfur and in the presence of the inert organic solvent, such as benzene, to produce the corresponding secondary phosphine sulfide. Reactions of this type are carried out, according to the present invention, in an inert atmosphere, i.e., a non-oxidative atmosphere, such as in the presence of nitrogen, hydrogen, $CO_2$, and the like, and at temperatures in the range of 0° C. to 100° C., preferably 15° C. to 75° C. Preferably, the temperature employed is below the boiling point of the solvent employed.

For instance, 2,4,6-triisopropyl-1,3-dioxa-5-phosphacyclohexane is reacted as follows with sulfur under nitrogen and in the presence of benzene to produce 2,4,6 - triisopropyl - 1,3 - dioxa - 5 - phosphacyclohexane-5-sulfide:

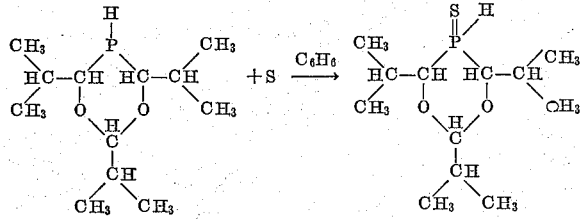

Among the numerous secondary phosphines suitable for the present invention are the compounds corresponding to the formula

wherein Ra and Rb are the same as above.

The 2,4,6 - trisecondaryalkyl - 1,3 -dioxa - 5 - phosphacyclohexanes contemplated herein are prepared as described in copending U.S. application Serial No. 766,656, filed October 13, 1958, now U.S. Patent No. 2,984,683, which is incorporated herein by reference. The 2,4,6-triisopropyl - 1,3 - dioxa - 5 - phosphacyclohexane referred to above, for example, is prepared as shown in Example A, infra.

Typical secondary phosphines within the purview of the instant invention are: diphenylphosphine; bis(4 - chlorophenyl)phosphine; dibutylphosphine; didodecylphosphine; bis(2 - phenylethyl)phosphine; dicyclohexylphosphine; bis(3 - ethylhexyl)phosphine; bis(2,4,4 - trimethylpentyl)phosphine; bis(3 - chloropropyl)phosphine. bis(2-butenyl)phosphine; ethylhexylphosphine; dioctylphosphine; diisooctylphosphine; bis(3 - methoxycyclohexyl)-phosphine; bis(3 - ethoxycyclopentenyl)phosphine; 2,4,6-tris(3 - heptyl) - 1,3 - dioxa - 5 - phosphacyclohexane; 2-(3 - hexyl) - 4,6 - diisopropyl - 1,3 - dioxa - 5 - phosphacyclohexane; bis(2 - phenoxyethyl)phosphine; bis(2-aminoethyl)phosphine; bis(2 - nitropropyl)phosphine; bis-(2 - sulfoethyl)phosphine; bis(carbamylmethyl)phosphine; bis(2 - ureidoethyl)phosphine; bis(hydroxymethyl)-phosphine; bis(1 - hydroxyhexyl)phosphine; bis(3 - carboxypropyl)phosphine; bis(3 - carbethoxypropyl)phosphine; bis(4 - aminophenyl)phosphine; bis[2(4 - aminophenyl)ethyl]phosphine; and the like; and mixtures thereof, such as a reactant mixture of dioctylphosphine and diisooctylphosphine, and similar mixtures.

The inert organic solvents contemplated herein, i.e., inert with respect to the reactants and the reaction products under the conditions of the reaction, are numerous. Typical among these are hydrocarbon and chlorinated hydrocarbon solvents, such as benzene, toluene, xylene, hexane, heptane, chloroform, carbon tetrachloride, dichloroethane, perchloroethylene, methylene dichloride, and the like.

While atmospheric pressures are desirable for reaction of the secondary phosphines with sulfur, super- and subatmospheric pressures are suitable.

The reactants contemplated herein are generally present in stoichiometric quantities, i.e., in substantially equimolar amounts, although an excess of the secondary phosphine may be tolerated.

The products of the present invention are useful as fungicides and nematocides.

Included among the many substituents contemplated for Ra and Rb, respectively, in the formula given above are alkoxy, halogen, aryloxy, aralkoxy, alkaryloxy, amino, nitro, ureido, sulfo, hydroxyl, carbamyl, acyloxy, carbalkoxy, carboxy, aryl, and the like.

The following example illustrates a method of preparing a typical 2,4,6-trisecondaryalkyl-1,3-dioxa-5-phosphacyclohexane secondary phosphine of the type contemplated herein:

EXAMPLE A

*2,4,6-Triisopropyl-1,3-Dioxa-5-Phosphacyclohexane*

A one liter, three-necked reactor flask is equipped with a gas inlet tube, an addition funnel, a mechanical stirrer and a gas bubbler device so disposed that all exit gases from the flask pass upwardly therethrough, the bubbler device comprising a column containing a two-inch head of water. The reactor flask is charged with a solution mixture at ambient temperature (21° C.–23° C.) of 200 milliliters of a concentrated aqueous solution of hydrochloric acid containing 37.7 percent HCl by weight and 200 milliliters of tetrahydrofuran.

Subsequently, the flask system and the charge are purged substantially free of oxygen-containing gas with nitrogen gas, and then a total of 108 grams (1.5 moles) of isobutyraldehyde and 17 grams (0.5 mole) of gaseous phosphine, at ambient temperature (21° C.–23° C.), is slowly and continuously introduced into the charge over a period of 30 minutes.

A reaction mixture results which, after settling for 30 minutes, leaves an upper organic layer or phase which is separated from the remaining reaction mixture and distilled under reduced pressure. A total of 91 grams (78 percent of theory) of product 2,4,6-triisopropyl-1,3-dioxa-5-phosphacyclohexane is thus collected as a colorless liquid having a boiling point of 100° C.–101° C. at 8 millimeters pressure. The material has a pungent odor and a refractive index of $n_D^{25} = 1.4602$. Analysis. Calculated for $C_{12}H_{25}O_2P$: C, 62.04; H, 10.85; P, 13.34. Found: C, 61.82; H, 10.78; P, 13.26.

The present invention will best be understood by reference to the following illustrative examples:

EXAMPLE I

Seventy cubic centimeters of benzene and 7.5 grams (0.05 mole) of di-n-butylphosphine are admixed. To the resulting solution 1.65 grams (0.05 mole) of powdered sulfur is added under nitrogen. The resulting mixture is stirred and allowed to stand overnight. Upon removing the benzene solvent di-n-butylphosphine sulfide is recovered having the following analysis: Calculated for $C_8H_{19}PS$: C, 53.9; H, 10.75; P, 17.4; S, 18.0. Found: C, 52.33; H, 10.41; P, 17.69; S, 18.0.

EXAMPLE II

A solution of 5.0 grams (0.033 mole) of diisobutylphosphine in 50 cubic centimeters of benzene is prepared. To this solution 1.1 grams (0.033 mole) of powdered sulfur is added under nitrogen and the resulting mixture thoroughly agitated. This mixture is allowed to stand overnight and then the solvent removed. A crystalline diisobutylphosphine sulfide is recovered having the following analysis: Calculated for $C_8H_{19}PS$: C, 53.89; H, 10.74; S, 17.99. Found: C, 53.89; H, 11.06; S, 18.29.

EXAMPLE III

To a solution comprising 4.5 grams (0.0192 mole) of bis(2-carbethoxyethyl)phosphine in 60 cubic centimeters of benzene is added under nitrogen 0.62 gram (0.0192 mole) of powdered sulfur. The resulting mixture is agitated and allowed to stand overnight. The solvent is removed and the resulting bis(2-carbethoxyethyl)phosphine sulfide recovered. Analysis. Calculated for $C_{10}H_{19}PSO_4$: C, 45.10; H, 7.19; P, 11.63. Found: C, 45.26; H, 7.19; P, 11.88.

EXAMPLE IV

To a solution comprising 7.0 grams (0.03 mole) of 2,4,6-triisopropyl-1,3-dioxa-5-phosphacyclohexane in 75 cubic centimeters of benzene is added 0.96 gram (0.03 mole) of powdered sulfur under nitrogen and the resulting mixture stirred and allowed to stand overnight. Upon removal of the solvent the phosphine sulfide derivative is recovered.

EXAMPLE V

Example IV is repeated in every essential respect with the exception that 66 cubic centimeters of chloroform is substituted for the 75 cubic centimeters of benzene. As in Example IV, the corresponding phosphine sulfide product is recovered.

EXAMPLES VI–XIV

Equimolar amounts of sulfur and a secondary phosphine are reacted essentially as shown in Example I, above, the phosphines and solvents employed being given in the table below:

| Example | Secondary Phosphine | Solvent |
|---|---|---|
| VI | Cyclohexyl-2-cyanoethyl phosphine | $C_6H_6$ |
| VII | t-Octyl-2-cyanoethylphosphine | $C_6H_6$ |
| VIII | Diphenylphosphine | $CCl_4$ |
| IX | Bis(2-chlorophenyl)phosphine | $CH_2Cl_2$ |
| X | Methyl(isopropyl)phosphine | $CCl_4$ |
| XI | Methyl(phenyl)phosphine | $C_6H_6$ |
| XII | Bis(2-nitropropyl)phosphine | $C_6H_6$ |
| XIII | Didodecylphosphine | $C_6H_6$ |
| XIV | Bis(1-hydroxyhexyl)phosphine | $C_6H_6$ |

In each example the corresponding secondary phosphine sulfide is recovered.

As indicated above, the compounds of the present invention are useful as fungicides and nematocides. The following tables illustrate this activity (all percentages given as percent by weight):

TABLE II

| Di-n-butylphosphine sulfide (percent concentration) | *Sclerotinia fructigenia*, percent kill [1] |
|---|---|
| 0.001 | 100 |

[1] Numerical percentage.

TABLE III

| Di-n-butylphosphine sulfide (percent concentration) | Vinegar Eelworm, Anguilla sp., percent kill [1] |
|---|---|
| 0.1 | 100 |

[1] Numerical percentage.

Referring to Table II, above, a water mixture of 0.001 percent di-n-butylphosphine sulfide produced according to the present invention is prepared and the spores admixed therewith for a 20-hour period. After this period the spores are examined microscopically to determine percent germination.

Referring to Table III, a water mixture of 0.1 percent di-n-butylphosphine sulfide produced according to the present invention is prepared and nematodes admixed therewith for a 20-hour period. Immediately thereafter percent mortality is recorded.

Obviously, the compounds of the present invention manifest varying degrees of nematocidal and fungicidal activity and the above illustrations are merely typical.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

What is claimed is:
1. Di-n-butyl phosphine sulfide.
2. Di-isobutylphosphine sulfide.
3. Bis(2-carbethoxyethyl)phosphine sulfide.
4. 2,4,6-triisopropyl-1,3-dioxa-5-phosphacyclohexane-5-sulfide.

5. A secondary phosphine sulfide corresponding to the formula

X—H wherein X represents

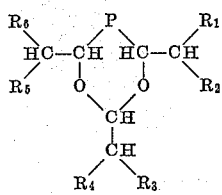

wherein $R_1$ to $R_6$ each represent alkyl having from 1 to 10 carbon atoms, and $R_1$, $R_2$, $R_3$, $R_4$, $R_5$ and $R_6$ need not be the same radicals.

6. A method of preparing a secondary phosphine sulfide corresponding to the general formula

X—H wherein X is a member selected from the group consisting of

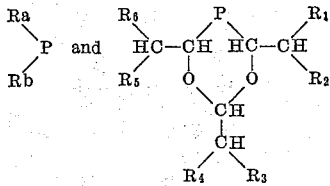

wherein Ra and Rb, respectively, represent a member selected from the group consisting of substituted and unsubstituted, branched and straight chain alkyl having from 2 to 18 carbon atoms, substituted and unsubstituted phenyl, substituted and unsubstituted cyclohexyl, substituted and unsubstituted cyclopentyl, said substituents for alkyl, phenyl, cyclohexyl and cyclopentyl being selected from the group consisting of lower alkoxy, halogen, phenoxy, amino, cyano, nitro, ureido, sulfo, hydroxy, carbamyl, carb(lower)-alkoxy, carboxy, and phenyl; and Ra and Rb, respectively, are attached directly to the phosphorus atom through a carbon atom; Ra and Rb can be the same and they can be different; $R_1$ to $R_6$ each represent alkyl having from 1 to 10 carbon atoms, and $R_1$, $R_2$, $R_3$, $R_4$, $R_5$ and $R_6$ need not be the same radicals; which comprises reacting equimolar amounts of sulfur and a secondary phosphine of the formula selected from the group consisting of

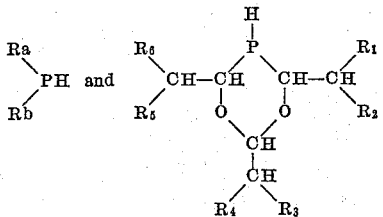

wherein Ra, Rb, and $R_1$ to $R_6$ have the meanings given hereinabove; said reaction being made to take place at a temperature in the range of 0° C. to 100° C. in an inert organic solvent and in an inert atmosphere; and recovering the resulting corresponding secondary phosphine sulfide.

7. A method according to claim 6 wherein the solvent is benzene.

References Cited by the Examiner
UNITED STATES PATENTS

| | | | |
|---|---|---|---|
| 2,138,835 | 12/38 | Butz | 260—606.5 |
| 2,274,291 | 2/42 | Clayton et al. | 252—53 |
| 2,573,568 | 10/51 | Hartman et al. | 252—49.9 |
| 2,653,161 | 9/53 | Ballard et al. | 260—461 |
| 2,856,369 | 10/58 | Smith et al. | 260—2 |

OTHER REFERENCES

"Organophosphorus Compounds" (Kosolapoff), pub. by John Wiley and Sons, Inc. (N.Y.), 1950, (pages 99 and 141). Also, pages 23 and 38–40, and page 31.

Malatesta: "Gazz. Chim. Ital.," 77, 509–511, 520–524 (1947).

LORRAINE A. WEINBERGER, *Acting Primary Examiner.*

LEON ZITVER, TOBIAS E. LEVOW, ABRAHAM H. WINKELSTEIN, ROGER L. CAMPBELL, *Examiners.*